United States Patent
Braden

(10) Patent No.: US 6,394,708 B1
(45) Date of Patent: May 28, 2002

(54) RECEIVER FOR PNEUMATIC CONVEYOR

(75) Inventor: John Braden, Battle Creek, MI (US)

(73) Assignee: Prab, Inc., Kalamazoo, MI (US)

( * ) Notice: Subject to any disclaimer, the term of this patent is extended or adjusted under 35 U.S.C. 154(b) by 0 days.

(21) Appl. No.: 09/567,695

(22) Filed: May 9, 2000

(51) Int. Cl.[7] .............................................. B65G 53/60

(52) U.S. Cl. ...................................... 406/173; 406/174

(58) Field of Search ......................... 251/333; 406/173, 406/169, 174, 168

(56) References Cited

U.S. PATENT DOCUMENTS

| | | | | |
|---|---|---|---|---|
| 2,992,858 A | * | 7/1961 | Pendleton | 406/173 X |
| 3,635,377 A | | 1/1972 | Potvin | |
| 3,776,600 A | * | 12/1973 | McLeod, Jr. | 406/169 X |
| 4,200,415 A | * | 4/1980 | Boring | 406/173 |
| 4,264,243 A | * | 4/1981 | Bentzen-Bilkvist | 406/173 X |
| 4,279,549 A | | 7/1981 | Hanrot et al. | |
| 5,492,453 A | | 2/1996 | Mouritzen et al. | |
| 5,536,118 A | | 7/1996 | Schmidt et al. | |

OTHER PUBLICATIONS

Brochure entitled "High Performance Compact Pneumatic Conveyor Systems", Hapman Conveyors, Kalamazoo, MI (1993).
Brochure entitled "HAPMAN", Hapman Conveyors, Kalamazoo, MI.

* cited by examiner

Primary Examiner—Christopher P. Ellis
Assistant Examiner—Joe Dillon, Jr.
(74) Attorney, Agent, or Firm—Olson & Hierl, Ltd.

(57) ABSTRACT

A receiver for a pneumatic conveyor for receiving and discharging particulate matter includes an upstanding receptacle having an inlet port and a gravity feed discharge opening. A flow control valve at the discharge opening controls discharge flow of particulate matter from the upstanding receptacle. The flow control valve includes a tapered valve seat circumscribing the discharge opening and a tapered plug selectively engageable with the valve seat from below to selectively occlude the discharge opening. The plug is connected to a stem mounted within the upstanding receptacle to permit reciprocal motion of the stem and plug substantially parallel to the discharge flow of particulate matter. An actuator reciprocates the stem selectively. In a first position the plug engages the valve seat, occluding the discharge opening and forming a substantially air tight seal, and in a second position the plug is displaced from the valve seat, permitting discharge of particulate matter.

15 Claims, 2 Drawing Sheets

RECEIVER FOR PNEUMATIC CONVEYOR

FIELD OF THE INVENTION

This invention relates generally to pneumatic conveyors for conveying particulate matter, and relates more particularly to a receiver for separating conveyed solids from air in a pneumatic conveyor system.

BACKGROUND OF THE INVENTION

Pneumatic conveyors convey a stream of particulate material fluidized in air through a piping system, and are known to employ a receiver for separating conveyed solids from air at the outlet end of the conveyor. The receiver can take the form of a cyclone separator having a tangential inlet, a bottom outlet for solids, and a top outlet for air. To induce the flow of the conveyed particulates into the receiver through the tangential inlet, a vacuum can be drawn in the receiver through the top outlet. This requires that the bottom outlet be closed. Particulates collected in the receiver must be discharged periodically, however, which requires that the bottom outlet be open. These competing requirements are satisfied with a discharge valve arrangement that can be selectively closed to prevent entry of air whilst drawing a vacuum, and selectively opened periodically to discharge collected particulates. Prior discharge valves have not been entirely satisfactory in meeting both requirements. It would be desirable to provide an improved discharge valve in a receiver of a pneumatic conveyor that more effectively functions as both an air seal and as a discharge flow control valve. This and other desirable attributes are achieved by the present invention.

SUMMARY OF THE INVENTION

According to one aspect of the invention, a receiver for a pneumatic conveyor having an improved flow control valve is provided for receiving and discharging particulate matter. The receiver includes an upstanding receptacle having an inlet port and a gravity feed discharge opening. A flow control valve at the discharge opening controls discharge flow of particulate matter from the upstanding receptacle. The flow control valve includes a valve seat circumscribing the discharge opening and a tapered plug selectively engageable with the valve seat to selectively occlude the discharge opening.

It is an object of the present invention to provide a solids/air separating receiver for a pneumatic conveyor having an improved particulate discharge valve.

Other aspects, objects and advantages of the present invention will be apparent from the description below of the preferred embodiment.

DETAILED DESCRIPTION OF PREFERRED EMBODIMENTS

Figure 1:
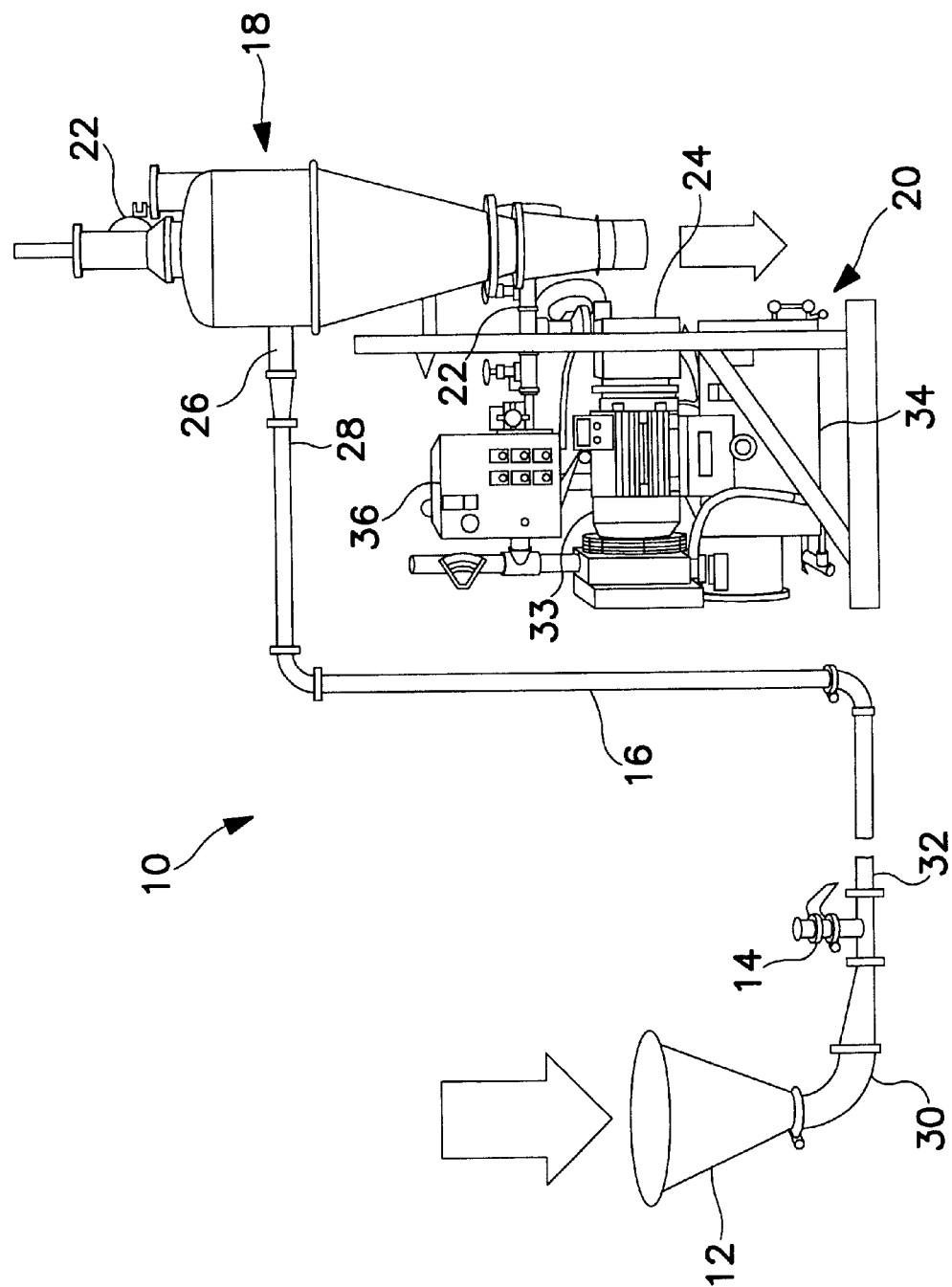
FIG. 1 is an elevation view of a pneumatic conveyor system in accordance with the present invention.

Referring in particular to FIG. 1, a pneumatic conveyor system 10 in accordance with the present invention is illustrated. Pneumatic conveyor system 10 includes as principal components a feed hopper 12, a fluidizing valve 14, conveyor piping 16, a solids/air separating receiver 18, pneumatic vacuum drawing apparatus 20, and vacuum piping 22.

Before describing the various components in detail, a brief overview of the mode of operation of pneumatic conveyor systems is in order. Pneumatic conveyors are useful for transporting bulk particulate materials from an inlet location through a piping system to an outlet location. In general, pneumatic conveyors operate by transporting particulate materials fluidized in a stream of air. The motive force for generating the stream of air can be an air pump at the inlet location that "pushes" the air and fluidized particulate material through the piping system, or as preferred, a vacuum pump at the outlet location that "pulls" the air and fluidized particulate material through the piping system. The vacuum system is preferred because, among other reasons, there are no moving parts at the material inlet, ensuring operator safety. At the outlet location in a vacuum system, the particulate material must be separated from the stream of air before entering the vacuum pump. One known apparatus for separating fine particulates from a stream of air is the cyclone separator. A vacuum applied to a receiver vessel of the separator draws the stream of air and particulates into the receiver through a tangential inlet port to form a column of air and particulates that rotates within the receiver about a vertical axis. Centrifugal force causes the particulates to move outwardly toward the walls of the receiver where they gather and fall downwardly by force of gravity. The air, separated from the particulates, exits at the top end of the receiver.

Turning now to the pneumatic conveyor system 10 illustrated in FIG. 1, the mode of operation discussed above will be applied in relation to the recited principal components. Pneumatic vacuum drawing apparatus 20, including a vacuum pump 24, draws a vacuum through vacuum piping 22, which communicates with solids/air separating receiver 18 at a top end thereof. Air pressure within receiver 18 is thereby reduced relative to ambient pressure. A tangential inlet port 26 communicates with receiver 18 at the side thereof, and also communicates with an outlet end 28 of piping system 16. Feed hopper 12 communicates via a reduction elbow 30 and fluidizing valve 14 with an inlet end 32 of piping system 16. Except for fluidizing valve 14, the function of which is described below, piping system 16 is closed between feed hopper 12 and receiver 18, resulting in a pressure gradient between ambient pressure at feed hopper 12 and the reduced pressure within receiver 18. The pressure gradient induces a stream of air to flow from feed hopper 12, through piping system 16 and tangential inlet port 26, and into receiver 18.

Bulk particulate material is introduced by an operator into feed hopper 12 from any desired and appropriate source, and thence is carried by the stream of air into receiver 18 where the particulates and air are separated as described above. To facilitate the flow of particulates through piping system 16, fluidizing valve 14 at inlet end 32 is adjusted to admit pulses of ambient air into piping system 16 immediately downstream of feed hopper 12 and reduction elbow 30. Fluidizing valve 14 permits air to percolate through the column of particulate material being conveyed within piping system 16, creating pulsating waves that fluidize bulk particulate material in the system so as to reduce friction and thereby increase the convey rate.

Pneumatic vacuum drawing apparatus 20, in addition to the vacuum pump 24 recited previously, includes an electric motor 33 for driving pump 24, a liquid seal tank 34, and electrical controls 36. As preferred, vacuum pump 24 is a liquid ring vacuum pump that includes an eccentric pump impeller that spins liquid out at the tips of the impeller vanes, whereby the liquid forms an air tight seal between the impeller vanes and housing without mechanical contact. The liquid ring vacuum pump is particularly well suited for the present use because particulate fines that get past the solids/air separating receiver 18 can run through the pump without causing abrasive wear of the impeller seal. The pump seal liquid can be oil or water and can be recirculated and filtered to capture fines. In the case of water seal, alternatively the liquid can be continuously replenished to allow fines, if non-toxic, to run through the pump to a drain or water treatment facility.

Figure 2:
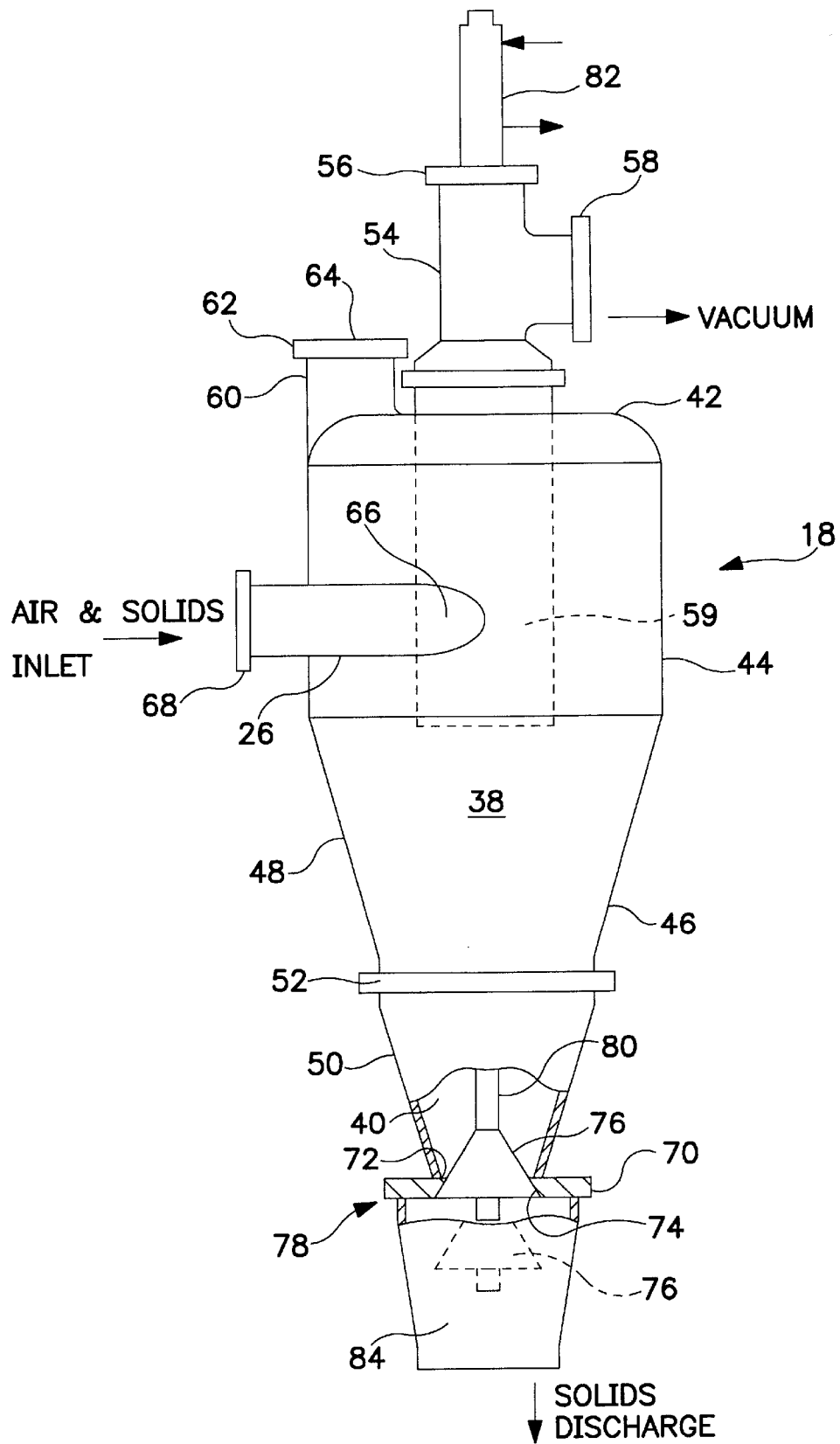
FIG. 2 is an elevation view of a solids-air separating receiver of the pneumatic conveyor system of FIG. 1, shown partially cut away and in section to reveal a discharge control valve in accordance with the present invention.

Referring to FIG. 2, the solids/air separating receiver 18 is illustrated and described in greater detail. Receiver 18 includes an upstanding hollow receptacle 38 comprising a hollow body of rotation defined about a vertical, longitudinal axis. Receptacle 38 includes an interior space 40 defined by a domed top 42, a cylindrical midsection 44 depending from domed top 42, and a frusto-conical gravity fed hopper 46 depending from midsection 44. Hopper 46 includes an upper portion 48 and a lower portion 50 joined together by a bolted flange 52. A hollow, air outlet fitting 54, in communication with interior space 40, extends upwardly from domed top 42 coaxially with the longitudinal vertical axis of receptacle 38. Air outlet fitting 54 is sealed at a top end 56, and includes a side fitting 58 in communication with a stack 59 that extends into interior space 40 and opens below tangential inlet port 26. Side fitting 58 is connected in communication with vacuum piping 22 (see FIG. 1). An eccentrically placed view port 60, in communication with space 40, extends upwardly from, domed top 42 and is sealed at a top end 62 by a transparent window 64. View port 60 is optional and permits visual inspection of the interior of receptacle 38. Tangential inlet port 26 is oriented and connected tangentially at a first end 66 to cylindrical midsection 44 and communicates therethrough with space 40. Tangential inlet port 26, at a second end 68, is connected to and communicates with outlet end 28 of conveyor piping system 16 (see FIG. 1).

Again referring to FIG. 2, a valve structure for controlling the discharge of particulate material from receptacle 38 and for effecting an air tight seal at the lower terminus of hopper 46 is also shown. Frusto-conical hopper 46 of receptacle 38 terminates at its frustum in a valve plate 70 comprising a flat plate occluding the outlet of hopper 46 but for a discharge opening 72 defined by valve plate 70. As preferred, discharge opening 72 is round in horizontal cross-section and is coaxial with the vertical, longitudinal axis of receptacle 38. Discharge opening 72 through valve plate 70, as preferred, is circumscribed by a wall sloping downwardly and radially outwardly to form an annular valve seat 74. As preferred, valve seat 74 is constructed of steel and slopes conically relative to the vertical, longitudinal axis at an angle in the range from about 10 degrees to about 50 degrees, preferably about 30 degrees. Valve seat 74 has a seat width in the range from a knife edge to about one-eighth inch.

Disposed coaxially with discharge opening 72 and annular valve seat 74 is a tapered plug 76 having a substantially conical outer wall sloping downwardly and radially outwardly. The outer wall of plug 76, as preferred, slopes conically relative to the vertical, longitudinal axis of receptacle 38 at an angle in the range of about 10 degrees to about 50 degrees, preferably about 30 degrees. As preferred, the angle of slope of the conical outer wall of plug 76 is about equal to the angle of slope of the annular valve seat 74, or slightly less. Plug 76 has a major diameter that is greater than the minor diameter of valve seat 74 to ensure that plug 76 can engage valve seat 74 from below without passing entirely through discharge opening 72 into space 40. The valve plug 76, as preferred, has a major diameter of about four inches. As preferred, the conical outer wall of plug 76, at least in the region engageable with valve seat 74, is softer than valve seat 74 and constructed of high density polyethylene. Other materials such as metal or other polymers such as polyurethane could be used instead, if desired.

Plug 76 and valve seat 74 cooperate to form a flow control valve 78 at discharge opening 72 to control the discharge flow of particulate matter from upstanding receptacle 38, the plug 76 being selectively engageable with the valve seat 74 to selectively occlude the discharge opening 72. Flow control valve 78 also serves to selectively create a substantially air tight seal at discharge opening 72 to prevent ambient air from entering space 40 of receptacle 38, thereby allowing a vacuum to be drawn in receptacle 38 when flow control valve 78 is closed.

Although valve plug 76 has been illustrated in its preferred form as a conically tapered plug tapering upwardly and radially inwardly, plug 76 can be any pyramidoid tapering upwardly and radially inwardly, and having any number of sides, with such a plug approaching a substantially conical configuration as the number of sides is increased. Likewise, the valve seat 74 can have any number of discrete facets corresponding to the number of sides of a mating pyramidoid plug.

Valve plug 76 extends into and is mounted to receptacle 38 so as to permit reciprocal motion of plug 76 along the vertical, longitudinal axis of receptacle 38, substantially parallel to the discharge flow of particulate matter through discharge opening 72. The reciprocal motion of plug 76 is achieved via a stem 80, connected to plug 76, disposed vertically within receptacle 38 and mounted thereto for reciprocal motion along the vertical, longitudinal axis of receptacle 38. More particularly, stem 80 is connected at an upper end to an actuator 82 mounted to outlet fitting 54 coaxially therewith. Actuator 82 has a linearly extensible member (not shown) extending downwardly through top end 56 into space 40 and connecting to stem 80. As preferred, actuator 82 is a pneumatic cylinder having a piston connected to the extensible member. Other actuators could be employed instead, such as a hydraulic cylinder, an electric solenoid, a rack and pinion gear set, etc.

A frusto-conical shroud 84 depends from valve plate 70 in lateral spaced relationship with plug 76. Shroud 84 serves to limit the lateral deflection of the discharged particulate material flowing over valve plug 76 when valve 78 is open. Shroud 84, which is optional, can also serve as a mounting surface for an optional bagging system or chute (not shown) disposed below discharge opening 72.

Pneumatic conveyor system embodying the present invention operates as follows. Actuator 82 is actuated to withdraw its extensible member, thereby lifting stem 80 and attached plug 76 into engagement with valve seat 74. Vacuum drawing apparatus 20 is then activated to draw a vacuum in receptacle 38. As the pressure within receptacle 38 decreases, ambient air pressure acting upon plug 76 pushes the conical outer wall of plug 76 into tight engagement with annular valve seat 74, effecting an air tight seal of discharge opening 72. The pressure gradient established by the vacuum drawing apparatus 20 causes a stream of air carrying particulates from feed hopper 12 to flow through conveyor piping 16 and through tangential inlet port 26 into space 40 of receptacle 38. A column of air and particulate matter rotating about a vertical axis is established within receptacle 38, and the particulate matter is thrown outwardly by centrifugal force toward the walls of receptacle 38, where the particulates separate from the air stream and fall under force of gravity and collect in hopper 46. When hopper 46 is full, or prior to fullness if desired, vacuum drawing apparatus 20 is deactivated and pressure within and without receptacle 38 is equalized by opening a relief air valve (not shown). Actuator 80 is actuated to extend its extensible member, lowering stem 80 and displacing plug 76 downwardly away from valve seat 74, thereby opening flow control valve 78 to permit collected particulate matter in hopper 46 to exit receptacle 38 in a downward discharge flow through discharge opening 72. The stroke of actuator 82 is about four inches, resulting in plug 76 being displaced about four inches from valve seat 74 when valve 78 is open, as shown in phantom in FIG. 2. Material discharged through discharge opening 72 flows uniformly over the conical outer wall of plug 76 through an annular gap between plug 76 and annular valve seat 74. The discharge flow over the valve seat 74 and plug 76 that comprise the mating surfaces of flow control valve 78 helps to keep the valve surfaces clean. Because the sealing surfaces of flow control valve 78, namely plug 76 and annular valve seat 74, do not slide relative to each other but rather abut during operation of valve 78, wear that could lead to air leakage is substantially minimized.

Although the present invention has been described with particularity with reference to drawings illustrating a preferred embodiment, it should be understood that the described and illustrated embodiment is merely illustrative of one manner of making and using the invention, and that the scope of the invention in which an exclusive right is claimed is defined by the claims appended below.

I claim:

1. A receiver for a pneumatic conveyor for receiving and discharging particulate matter, comprising:

an upstanding receptacle having an inlet port and a gravity feed discharge opening;

a flow control valve at the discharge opening controlling discharge flow of particulate matter from the upstanding receptacle, the flow control valve including a valve seat circumscribing the discharge opening and a tapered plug selectively engageable with the valve seat to selectively occlude the discharge opening;

wherein the plug is mounted to the upstanding receptacle to permit reciprocal motion of the plug into and out of the receptacle and substantially parallel to the discharge flow of particulate matter, between a first position in which the plug engages the valve seat, occluding the discharge opening, and a second position in which the plug is displaced from the valve seat; and an actuator connected to and disposed substantially externally of and above the upstanding receptacle and connected to the plug such that actuation of the actuator moves the plug between the first and second positions.

2. The receiver of claim 1, and further including a stem disposed within the upstanding receiver connecting the actuator and the plug and mounted thereto for longitudinal reciprocal motion.

3. The receiver of claim 1, in which the upstanding receiver has a substantially circular horizontal cross-section.

4. The receiver of claim 3, in which the inlet port is oriented substantially tangential to the upstanding receiver.

5. The receiver of claim 3, in which the upstanding receiver includes a body portion that is substantially cylindrical.

6. The receiver of claim 5, in which the inlet port enters the cylindrical body portion.

7. The receiver of claim 5, in which the upstanding receiver includes a substantially conical gravity fed hopper depending from the cylindrical body portion.

8. The receiver of claim 7, in which the discharge opening is disposed below the hopper.

9. A receiver for a pneumatic conveyor for receiving and discharging particulate matter, comprising:

an upstanding receptacle having an inlet port and a gravity feed discharge opening; and a flow control valve at the discharge opening controlling discharge flow of particulate matter from the upstanding receptacle, the flow control valve including a valve seat circumscribing the discharge opening and a tapered plug selectively engageable with the valve seat to selectively occlude the discharge opening, the plug being connected to a stem for reciprocal motion therewith, the stem being disposed within the upstanding receptacle and mounted thereto for longitudinal reciprocal motion, the plug being disposed for reciprocal motion into and out of the discharge opening of the receptacle, and an actuator connected to and disposed substantially externally of and above the upstanding receptacle and connected to the stem such that actuation of the actuator moves the stem and plug longitudinally.

10. The receiver of claim 1, in which the plug tapers upwardly and radially inwardly.

11. The receiver of claim 10, in which the valve seat has a minor diameter less than the maximum girth of the plug.

12. The receiver of claim 10, in which the plug is substantially conical.

13. The receiver of claim 1, in which the actuator includes a linearly extensible member.

14. The receiver of claim 13, in which the actuator comprises a pneumatic cylinder.

15. The receiver of claim 13, in which the actuator comprises a hydraulic cylinder.

* * * * *